United States Patent [19]

Savage Jr.

[11] Patent Number: 5,463,502
[45] Date of Patent: Oct. 31, 1995

[54] LENS ASSEMBLY FOR USE WITH LEDS

[76] Inventor: John M. Savage, Jr., 538-B Via De La Valle, Solana Beach, Calif. 92075

[21] Appl. No.: 243,418

[22] Filed: May 16, 1994

[51] Int. Cl.$^6$ ..................................................... G02B 7/02
[52] U.S. Cl. .......................... 359/819; 362/255; 362/226; 362/311; 361/767; 16/225
[58] Field of Search .................................. 359/804, 808, 359/809, 811, 818, 819, 820, 827, 829, 830, 742, 743; 362/255, 226, 311, 296, 396, 800; 361/767; 16/225

[56] References Cited

U.S. PATENT DOCUMENTS

| | | |
|---|---|---|
| D. 200,157 | 1/1965 | Vincent . |
| 1,747,896 | 2/1930 | Gates . |
| 2,042,199 | 5/1936 | Thomas . |
| 2,396,725 | 3/1946 | Thomas, Jr. . |
| 2,796,593 | 6/1957 | Offerman . |
| 2,829,359 | 4/1958 | Ritter . |
| 2,949,595 | 8/1960 | Doeleman ............... 439/551 |
| 2,951,226 | 8/1960 | Gittens . |
| 2,977,562 | 3/1961 | Benson . |
| 2,999,895 | 9/1961 | Smith . |
| 3,184,536 | 5/1965 | Vincent . |
| 3,335,387 | 8/1967 | Mueller ..................... 439/56 |
| 3,601,786 | 8/1971 | Brubaker . |
| 3,621,445 | 11/1971 | Horecky . |
| 3,663,931 | 5/1972 | Brown . |
| 3,887,803 | 6/1975 | Savage, Jr. . |
| 3,975,072 | 8/1976 | Ammon . |
| 4,035,681 | 7/1977 | Savage, Jr. . |
| 4,195,330 | 3/1980 | Savage, Jr. ............. 362/226 |
| 4,219,172 | 8/1980 | Murayama . |
| 4,398,240 | 8/1983 | Savage, Jr. ............. 362/311 |
| 4,402,110 | 9/1983 | Savage, Jr. ............. 16/225 |
| 4,471,414 | 9/1984 | Savage, Jr. ............. 362/226 |
| 4,491,900 | 1/1985 | Savage, Jr. ............. 362/230 |
| 4,727,648 | 3/1988 | Savage, Jr. ............. 362/226 |
| 4,821,152 | 4/1989 | Lorenzen ................ 361/767 |
| 4,837,927 | 6/1989 | Savage, Jr. . |
| 4,846,554 | 7/1989 | Mori et al. ............. 359/819 |
| 4,986,772 | 1/1991 | Fukutani . |
| 5,068,771 | 11/1991 | Savage, Jr. ............. 362/255 |
| 5,071,375 | 12/1991 | Savage, Jr. . |

FOREIGN PATENT DOCUMENTS

| | | |
|---|---|---|
| 2390032 | 1/1978 | France . |
| 1464176 | 2/1969 | Germany . |
| 2250007 | 5/1974 | Germany . |
| 2918620 | 11/1980 | Germany . |
| 2081516 | 2/1982 | United Kingdom . |

*Primary Examiner*—Loha Ben
*Attorney, Agent, or Firm*—William W. Haefliger

[57] ABSTRACT

In a lens assembly for use with an LED, the combination comprising a lens unit having a forward light transmitting lens portion and a tubular sleeve extending rearwardly therefrom; annularly outwardly protuberant rings integral with the sleeve, and a frusto-conical camming surface on and at the end of the sleeve, whereby a retainer ring may be assembled onto and over the sleeve in response to camming engagement with the frusto-conical surface; and by interference engagement with the protuberant rings, for gripping the sleeve and for retaining the lens unit to a panel having an opening through which the lens sleeve has been received; the gripped sleeve sized to allow the LED to be freely inserted into the sleeve and positioned for light transmission from the LED through the forward lens portion of the unit.

12 Claims, 2 Drawing Sheets

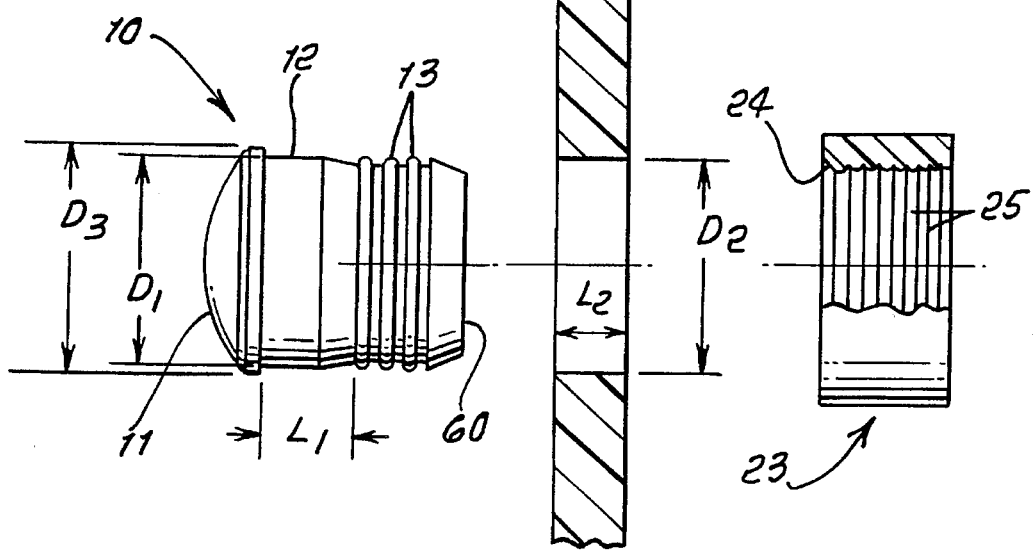
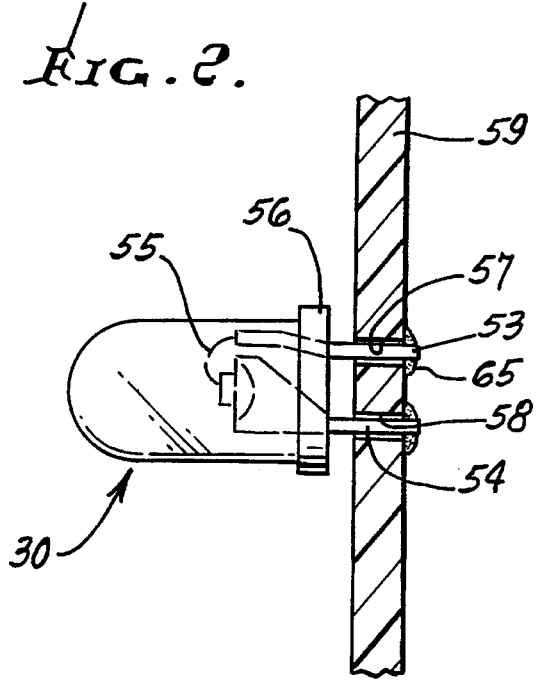
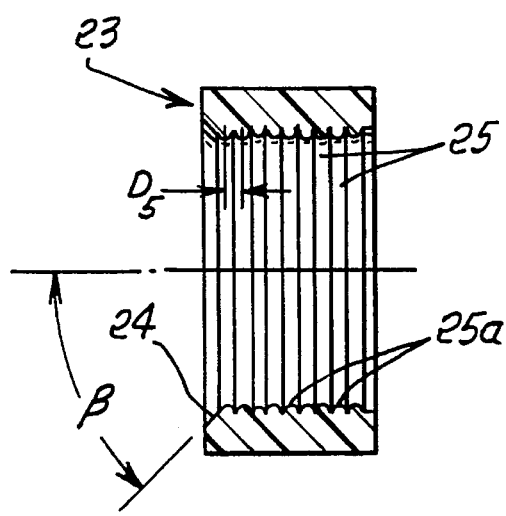

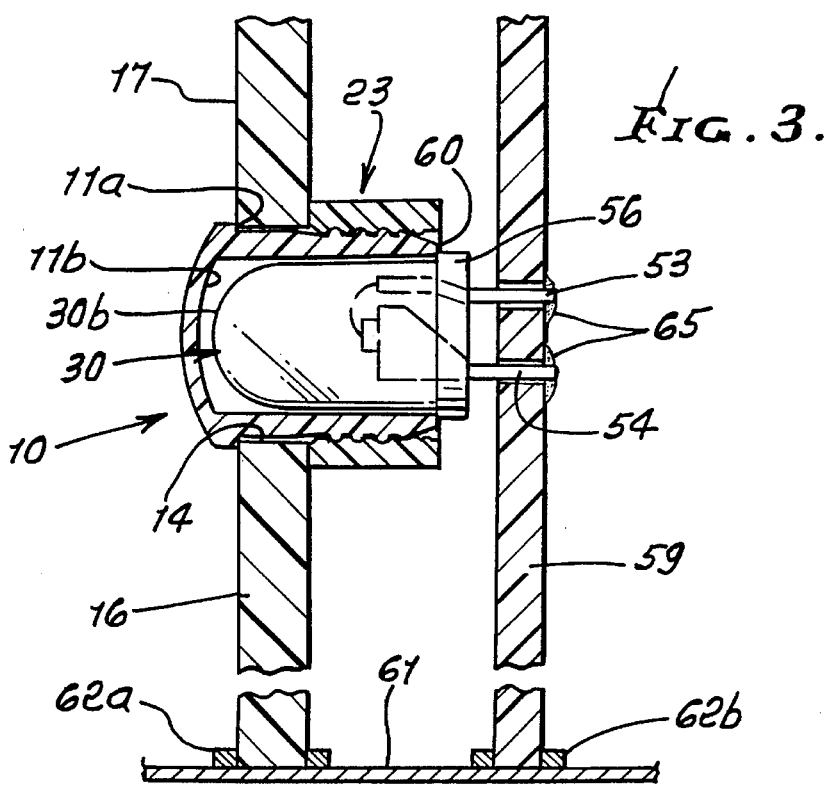
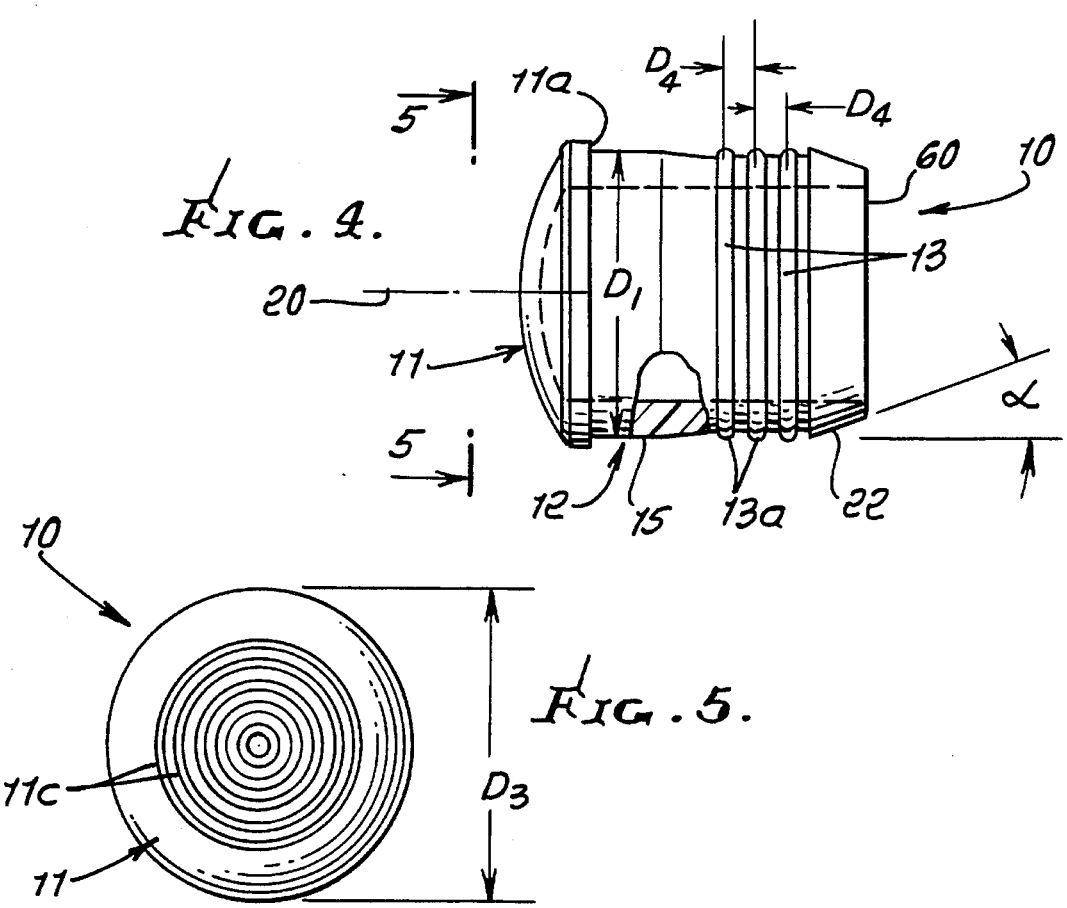

LENS ASSEMBLY FOR USE WITH LEDS

BACKGROUND OF THE INVENTION

This invention relates generally to the mounting of LEDs, and associated lens units; more particularly, it concerns effective mounting of lens units that receive LEDs to panels, where the LEDs are not directly attached to the lens units.

In the past, LEDs were positioned in, and directly attached to, so called lens caps which transmitted light generated by the LEDs. See for example U.S. Pat. No. 4,195,330 to Savage.

There is a need for assembly of LEDs to lens units or lens caps where the LEDs are carried by circuit boards, and where the lens units are to be connected to display or mounting panels, whereby the LEDs are then associated with said panels.

SUMMARY OF THE INVENTION

It is a major object of the present invention to provide a means of achieving or meeting the above need, whereas the need for directly connecting the LED to its associated lens unit is obviated. Basically, this object is met, in accordance with the invention, through provision of:

a) a lens unit having a forward light transmitting lens portion and a tubular sleeve extending rearwardly therefrom, b) annularly outwardly protuberant rings integral with the sleeve, and a frusto-conical camming surface on and at the end of the sleeve, c) whereby a retainer ring may be assembled onto and over the sleeve in response to camming engagement with said frusto-conical surface and by interference engagement with said protuberant rings, for gripping the sleeve and for retaining the lens unit to a panel having an opening through which the lens sleeve has been received, the gripped sleeve sized to allow the LED to be freely inserted into the sleeve and positioned for light transmission from the LED through said forward lens portion of said unit.

Accordingly, the LED, which is typically carried by a circuit board, may be freely assembled to the lens unit after the latter has been attached to the display panel by the retaining ring. This also permits the circuit board to be positioned close to the display panel, since the retaining ring need not be manipulated to effect gripping of the LED by structure associated with the lens unit sleeve.

As will be seen the retainer ring is sized to be assembled onto the sleeve, and to have interference engagement with the protuberant rings, to retain the lens unit to a display panel. The retainer ring may advantageously have a beveled end surface for camming engagement with the frusto-conical end surface on the lens unit, to slightly expand the retainer ring to fit over the protuberant rings.

Further, the retainer ring typically has internal generally annularly extending projections that have interference engagement with the rings on the sleeve during axial assembly of the retainer ring onto the sleeve. Such projections have crest portions facing toward said sleeve with crest to crest dimensions $D_1$, the rings on the sleeve have crest portions facing toward said retainer ring with crest to crest dimensions $D_2$, and $D_1$ differs from $D_2$. Accordingly, the interfit of the projections with the protuberant rings is such as to permit tight positive retention, by the retainer ring, of the lens unit to the display panel. In this regard, the protuberant rings may have crest portions that are outwardly convex in axial radial planes; and the projections on the retainer ring may also have crest portions that are convex inwardly, i.e. toward the protuberant ring crests, allowing camming engagement of the protuberant ring projections with the retainer ring projections, facilitating make-up of the retainer ring over the sleeve.

An additional object is the provision of a circuit board carrying the LED and positioning the LED endwise in the sleeve of the lens unit, mounted to the display panel, there being chassis structure mounting both the display panel and the circuit board.

These and other objects and advantages of the invention, as well as the details of an illustrative embodiment, will be more fully understood from the following specification and drawings, in which:

DRAWING DESCRIPTION

FIG. 1 is a vertical section showing lens unit positioned to be assembled to a display panel, and a retaining ring to retain the lens unit to the panel;

FIG. 2 is a vertical section showing a LED connected to a circuit board;

FIG. 3 is a view like FIGS. 1 and 2 showing an assembly of the lens unit to the display panel, and the circuit board positioned to locate the LED in the lens unit;

FIG. 4 is an enlarged side view of the lens unit seen in FIGS. 1 and 3;

FIG. 5 is an end view taken on lines 5—5 of FIG. 4; and

FIG. 6 is an enlarged sectional view of the retaining ring as also seen in FIG. 1.

DETAILED DESCRIPTION

In FIGS. 1, 4 and 5 a one-piece lens unit or cap 10 has a dome-shaped forward lens 11 and a rearwardly extending cylindrical sleeve or skirt 12 integral with the lens. The unit may consist of molded plastic material, such as polycarbonate. The sleeve includes or carries annularly outwardly protuberant rings 13, spaced closely together, and axially along the sleeve perimeter. The ring 13 closest to the lens 11 has spacing $L_1$ therefrom, slightly greater than the length $L_2$ of the bore 14 in a display panel 16. Sleeve outer annular surface 15 between the lens and the rings 13 closest to the lens has an outer diameter $D_1$ close to diameter $D_2$ of the bore 14, whereby the sleeve closely fits that bore, upon assembly. Lens 11 has an outer diameter $D_3$ greater than $D_2$, whereby a flange end surface 11a fits closely against the panel outer side 17, upon assembly. One example of dimension $D_1$ is 0.280 inch.

Rings 13 are shown as integral with the sleeve, and have outer diameters the same as, or substantially the same as diameter $D_1$ of surface 15, to enable their passage through bore 14, upon assembly. The rings have outer crest portions 13a that are outwardly convex in axial radial planes, such as the plane of FIG. 4. Note axis 20. The crest to crest dimensions are indicated at $D_4$. A frusto-conical camming surface 22 (bevel) is provided at the outer rearward end of the sleeve, and is indicated at 18. The angularity α of the bevel is less than 45°, and is preferably between 20° and 35°. The lens 11 is shown to have concentric grooves 11a, for diffusing light transmitted from the LED indicated at 30 in FIGS. 2 and 3. The lens 11 is light transmitting, and may be transparent or translucent.

In FIGS. 1, 3 and 6, a one-piece retainer ring or annulus 23 is shown for assembly onto and over the sleeve in response to outward camming engagement with surface 22, and by interference engagement with the protuberant rings 13, for gripping the sleeve and for retaining the lens unit to panel 16, as is seen in FIG. 3. In this regard, the gripped sleeve 12 is sized in such relation to the retainer ring as to allow the LED 30 to be freely inserted into the sleeve, and to be positioned for light transmission from the LED through the forward lens portion 11 of the unit 10. See FIG. 3.

The retainer ring 23 has a beveled end surface 24 which is also frusto-conical, for camming engagement with the frusto-conical surface 22, upon assembly. The angularity $\beta$ of surface 24 is in excess of $\alpha$, and is typically between 35° and 50°, for ease of camming assembly. Ring 23 is less hard than lens unit 11, and may typically consist of polypropylene, whereby ring 23 progressively deforms or expands in response to said camming engagement, to forcibly slide endwise over the rings 13.

The retainer ring 23 has internal, generally annularly extending projections 25 that have interference engagement with rings 13 on the sleeve during axial assembly of the ring 23 onto the lens unit. Such projections 25 have crest portions 25a facing toward the sleeve in FIG. 3, with crest to crest dimensions $D_5$, where $D_5$ differs from $D_4$. Typically, $D_5<D_4$, and there are at least twice as many projections 25 as rings 13, to assure clamp-up to panels of different thicknesses. As illustrated, there are nine projections 25, and three rings 13. The crests of the projections are also convex, and toward axis 20, in axial radial planes, to facilitate forcible interference riding of the projections over the rings, upon assembly. At clamp-up, at least two of the crests of projections 23 fit at least part way into the spaces between crests of successive rings 13, and engage the latter, for providing positive interlock.

FIGS. 2 and 3 show LED 30 as having leads 53 and 54 from the light emitter 55 extending rearwardly through a flange 56, and through openings 57 and 58 in PCB (printed circuit board) 59. The latter positions the LED for free entry into the sleeve, to correct position, for light transmission relative to lens 11. Multiple such LEDs may be positioned by the board, in multiple lens caps. Note curved surfaces 11b and 30b assembled close to one another. Flange 56 may act as a stop to limit entry of the LED into the sleeve, by engagement against end 60 of the sleeve, the retainer ring 23 having been assembled onto the sleeve to position the sleeve relative to the panel 16. Structure 62a attaches panel 16 to chassis 61; and structure 62b attaches board 59 to the chassis. Need for attachment of the LED to the lens unit is thereby obviated; and retainer 23 need not be removed form the lens cap sleeves to permit insertion of the LEDs into the lens caps. Also, LEDs may now be permanently connected as at 65 to the circuit board, prior to their assembly into the lens caps.

I claim:

1. In a lens assembly for use with an LED, the combination comprising a) a lens unit having a forward light transmitting lens portion and a tubular sleeve extending rearwardly therefrom, b) annularly outwardly protuberant rings integral with the sleeve, and a frusto-conical camming surface on and at the end of the sleeve, c) and a retainer ring assembled onto and over the sleeve in response to camming engagement with said frusto-conical surface, said retainer ring having interference engagement with said protuberant rings, for gripping the sleeve and for retaining the lens unit to a display panel having an opening through which the lens unit sleeve has been received, the gripped sleeve sized to allow the LED to be freely inserted into the sleeve and positioned for light transmission from the LED through said forward lens portion of said unit.

2. The combination of claim 1 including said panel defining said opening through which the lens unit sleeve is received.

3. The combination of claim 2 wherein the lens unit consists of relatively hard material, and the retainer ring consists of relatively soft material.

4. The combination of claim 1 wherein the retainer ring has a beveled end surface for camming engagement with said frusto-conical surface on the sleeve end.

5. The combination of claim 1 wherein said retainer ring has internal generally annularly extending projections that have interference engagement with said rings on the sleeve during axial assembly of the retainer ring onto the sleeve.

6. The combination of claim 5 wherein said generally annularly extending projections have crest portions facing toward said sleeve with crest to crest dimensions $D_5$, said rings on the sleeve having crest portions facing toward said retainer ring with crest to crest dimensions $D_4$, and where $D_5$ differs from $D_4$.

7. The combination of claim 6 wherein $D_5<D_4$.

8. The combination of claim 1 including said LED and a circuit board carrying the LED and positioning the LED endwise in said sleeve.

9. The combination of claim 8 including said display panel, and chassis structure mounting the circuit board and the display panel.

10. The combination of claim 9 including a flange on the LED, the circuit board positioned to engage the flange against an end of the lens unit, thereby to position the LED in and relative to said lens portion.

11. The combination of claim 1 wherein said sleeve is tubular and is free of endwise extending slots therein.

12. The combination of claim 1 wherein said protuberant rings have crest portions that are outwardly convex in axial radial planes.

* * * * *